US010171307B2

(12) United States Patent
Cawson

(10) Patent No.: US 10,171,307 B2
(45) Date of Patent: Jan. 1, 2019

(54) NETWORK MODALITY REDUCTION

(71) Applicant: International Business Machines Corporation, Armonk, NY (US)

(72) Inventor: Michael G. Cawson, Fenstanton (GB)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/229,894

(22) Filed: Aug. 5, 2016

(65) Prior Publication Data

US 2018/0041397 A1 Feb. 8, 2018

(51) Int. Cl.
*H04L 12/24* (2006.01)
*H04L 12/26* (2006.01)

(52) U.S. Cl.
CPC .......... *H04L 41/12* (2013.01); *H04L 43/0817* (2013.01)

(58) Field of Classification Search
CPC ...................................... H04L 41/12
See application file for complete search history.

(56) References Cited

U.S. PATENT DOCUMENTS

| 8,731,814 | B2 | 5/2014 | Schunder | |
| 8,874,616 | B1* | 10/2014 | Coffman | G06Q 50/01 |
| | | | | 707/798 |
| 9,819,744 | B1* | 11/2017 | Balasuriya | G06F 17/30899 |
| 2003/0140113 | A1* | 7/2003 | Balasuriya | G06F 17/30899 |
| | | | | 709/217 |
| 2005/0043023 | A1* | 2/2005 | Romeo | H04L 41/00 |
| | | | | 455/423 |
| 2006/0100881 | A1* | 5/2006 | He | G10L 15/22 |
| | | | | 704/270 |
| 2009/0307772 | A1* | 12/2009 | Markham | H04L 41/142 |
| | | | | 726/22 |
| 2012/0051589 | A1 | 3/2012 | Schloegel et al. | |
| 2012/0113821 | A1* | 5/2012 | Foster | H04L 45/00 |
| | | | | 370/250 |
| 2014/0019560 | A1* | 1/2014 | Li | H04L 43/50 |
| | | | | 709/206 |

(Continued)

FOREIGN PATENT DOCUMENTS

WO 2015024807 A1 2/2015

OTHER PUBLICATIONS

Lia et al., "Modeling the Effects of Public Bicycle Schemes in a Congested Multi-Modal Road Network", International Journal of Sustainable Transportation vol. 9, Issue 4, 2015, posted online: Jun. 24, 2014, 9 pages, Abstract Only, <http://www.tandfonline.com/doi/abs/10.1080/15568318.2013.767398>.

(Continued)

*Primary Examiner* — Lashonda T Jacobs
(74) *Attorney, Agent, or Firm* — Alexander G. Jochym

(57) ABSTRACT

A tool for processing a multi-modal network to reduce modality. The tool determines a plurality of entities connected by a plurality of links within a multi-modal network. The tool assigns a weighted value to each of the plurality of links connecting the plurality of entities. The tool converts the multi-modal network into a modelled network based, at least in part, on the weighted value assigned to each of the plurality of links. The tool eliminates one or more of the plurality of entities not designated as an entity of interest from the modelled network. The tool converts the modelled network into a uni-modal network.

20 Claims, 5 Drawing Sheets

(56) References Cited

U.S. PATENT DOCUMENTS

2015/0269613 A1\* 9/2015 Fernandez-Ruiz ......................... G06Q 30/0251
705/14.49
2015/0286973 A1 10/2015 Becher et al.
2016/0202079 A1\* 7/2016 Konig ................ G01C 21/3423
701/533

OTHER PUBLICATIONS

Sun et al., "Optimization Models and Solution Algorithms for Freight Routing Planning Problem in the Multi-Modal Transportation Networks: A Review of the State-of-the-Art", The Open Civil Engineering Journal, 2015, 9: 714-723, Electronic publication date: Sep. 17, 2014, <http://benthamopen.com/ABSTRACT/TOCIEJ-9-714>.

\* cited by examiner

NETWORK MODALITY REDUCTION

BACKGROUND OF THE INVENTION

The present invention relates generally to network analytics, and more particularly to processing a multi-modal network to reduce modality.

When fusing data from many sources, collecting information about relationships between entities for the purpose of understanding inter-relationships may result in a network with many different types of entities (e.g., people, organizations, phones, and computers, etc.), often referred to as multi-modal networks. Typically, most social network analysis (SNA) algorithms assume all entities (i.e., nodes) are of the same type, and edges (i.e., links) between the entities all represent the same kind of relationship.

SUMMARY

Aspects of an embodiment of the present invention disclose a method, a computer system, and a computer program product for processing a multi-modal network to reduce modality. The method includes determining, by one or more computer processors, a plurality of entities connected by a plurality of links within a multi-modal network. The method includes assigning, by the one or more processors, a weighted value to each of the plurality of links connecting the plurality of entities. The method includes converting, by the one or more computer processors, the multi-modal network into a modelled network based, at least in part, on the weighted value assigned to each of the plurality of links. The method includes eliminating, by the one or more computer processors, one or more of the plurality of entities not designated as an entity of interest from the modelled network. The method includes converting, by the one or more computer processors, the modelled network into a uni-modal network.

DETAILED DESCRIPTION

Embodiments of the present invention recognize that when network analytics are used on a multi-modal network, the results are often difficult to interpret and may be misleading.

Embodiments of the present invention provide the capability to process a multi-modal network, prior to network analysis, to reduce the modality. Embodiments of the present invention provide the capability to convert a multi-modal network into a uni-modal network, concentrating on a specific type of entity of interest (e.g., people), and account for different semantics of a plurality of relationships of different types shared between a plurality of entities of different types. Embodiments of the present invention provide the capability to enhance subsequent network analysis by reducing runtime demands through a reduction of nodes in the multi-modal network.

Implementation of such embodiments may take a variety of forms, and exemplary implementation details are discussed subsequently with reference to the Figures.

Figure 1:
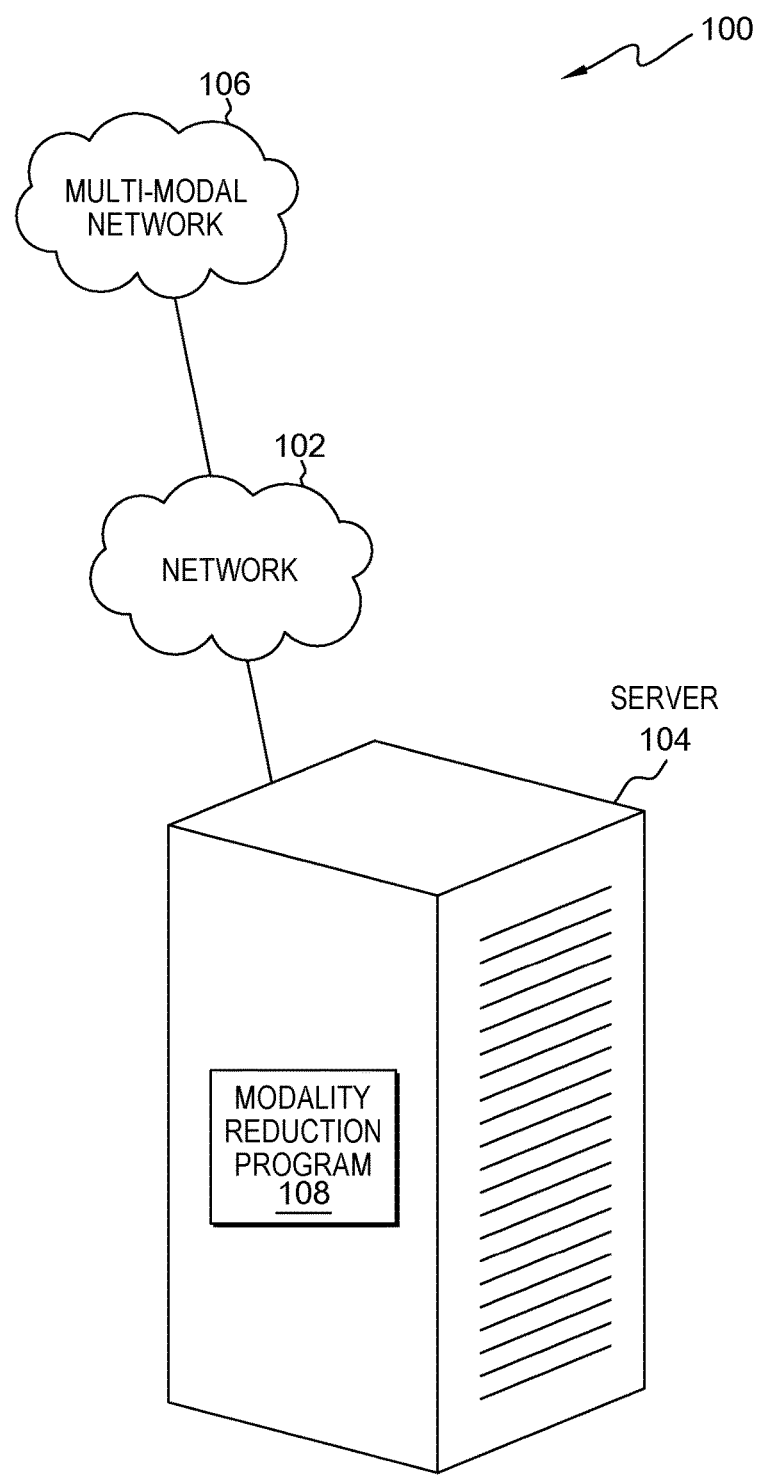
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. In an embodiment, data processing environment 100 may be a distributed data processing environment. The term "distributed" can describe a computer system that includes multiple, physically distinct devices that operate together as a single computer system. FIG. 1 provides only an illustration of one implementation and does not imply any limitations with regard to the environments in which different embodiments may be made by those skilled in the art without departing from the scope of the invention as recited by the claims. FIG. 1 includes network 102, server 104, and multi-modal network 106.

In one embodiment, network 102 is the Internet representing a worldwide collection of networks and gateways that use TCP/IP protocols to communicate with one another. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In one embodiment, server 104 and multi-modal network 106 are interconnected by network 102. Network 102 can be any combination of connections and protocols capable of supporting communications between server 104 multi-modal network 106, modality reduction program 108, and other computing devices (not shown) within data processing environment 100. FIG. 1 is intended as an example and not as an architectural limitation for the different embodiments.

In one embodiment, server 104 may be, for example, a server computer system, such as a database server, a management server, a web server, a structured query language server, or any other electronic device or computing system capable of sending and receiving data. In another embodiment, server 104 may be a data center consisting of a collection of networks and servers providing an IT service, such as virtual servers and applications deployed on virtual servers, to an external party. In another embodiment, server 104 represents a "cloud" of computers interconnected by one or more networks, where server 104 represents a computing system utilizing clustered computers and components (e.g., database server computers, application server computers, etc.) that act as a single pool of seamless resources when accessed within data processing environment 100. This is a common implementation for data centers in addition to cloud computing applications. Server 104 may include internal and external hardware components, as depicted and described in further detail with respect to FIG. 5. In the exemplary embodiment, server 104 includes modality reduction program 108 for reducing a complex multi-modal network of information about relationships between entities into a uni-modal network representative of the multi-modal network.

In one embodiment, modality reduction program 108 operates on a central server, such as server 104, and can be utilized by one or more client computers (not shown) via network 102. In another embodiment, modality reduction program 108 may be a software-based program downloaded from the central server, such as server 104, or a third-party provider (not shown), and executed on one or more client computers to process a multi-modal network, such as multi-modal network 106, to reduce modality. In another embodiment, modality reduction program 108 may be a software-based program, downloaded from a central server, such as server 104, and installed on one or more client computers. In yet another embodiment, modality reduction program 108 may be utilized as a software service provided by a third-party cloud service provider (not shown). In yet another embodiment, modality reduction program 108 may include one or more software-based components, such as add-ons, plug-ins, and agent programs, etc., installed on one or more client computers to process a multi-modal network, such as multi-modal network 106, to reduce modality.

In one embodiment, modality reduction program 108 is a software-based program for processing a multi-modal network, such as multi-modal network 106, to reduce modality. In one embodiment, modality reduction program 108 provides the capability to utilize the concept of electrical resistive circuit node elimination to reduce a complex multi-modal network of information about relationships between entities into a uni-modal network representative of the multi-modal network. In one embodiment, modality reduction program 108 models a multi-modal network as an equivalent uni-modal network that accounts for strengths of different types of relationships (i.e., connections) between different types of entities. In one embodiment, modality reduction program 108 creates a uni-modal network that may be suitable for subsequent use in standard network analysis, such as SNA. In one embodiment, modality reduction program 108 provides a modelling of a multi-modal network reduced to a uni-modal network for analyzing the multi-modal network from a single point of view (e.g., connectivity), taking into account multiple parallel routes acting simultaneously, similar to the flow of current through a complex resistive circuit. An illustrative example of a multi-modal network, such as multi-modal network 106, reduced to a uni-modal network is depicted and described in further detail with respect to FIG. 4.

In one embodiment, multi-modal network 106 is a conventional multi-modal network consisting of a plurality of entities (i.e., nodes) of multiple types connected by a plurality of links (i.e., edges) of multiple types. In one embodiment, multi-modal network 106 may include a plurality of entities, where the plurality of entities may be of one or more types including, but not limited to, a person, an organization, a location, a computing device, and a vehicle, etc. In one embodiment, multi-modal network may include a plurality of links between the plurality of entities, where the plurality of links may be of one or more types including, but not limited to, a link between two people, a link between a person and a computing device, and a link between two computing devices, a link between a person and a location, and a link between a computing device and a location, etc. An illustrative example of a multi-modal network, such as multi-modal network 106, is depicted and described in further detail with respect to FIG. 3.

Figure 2:
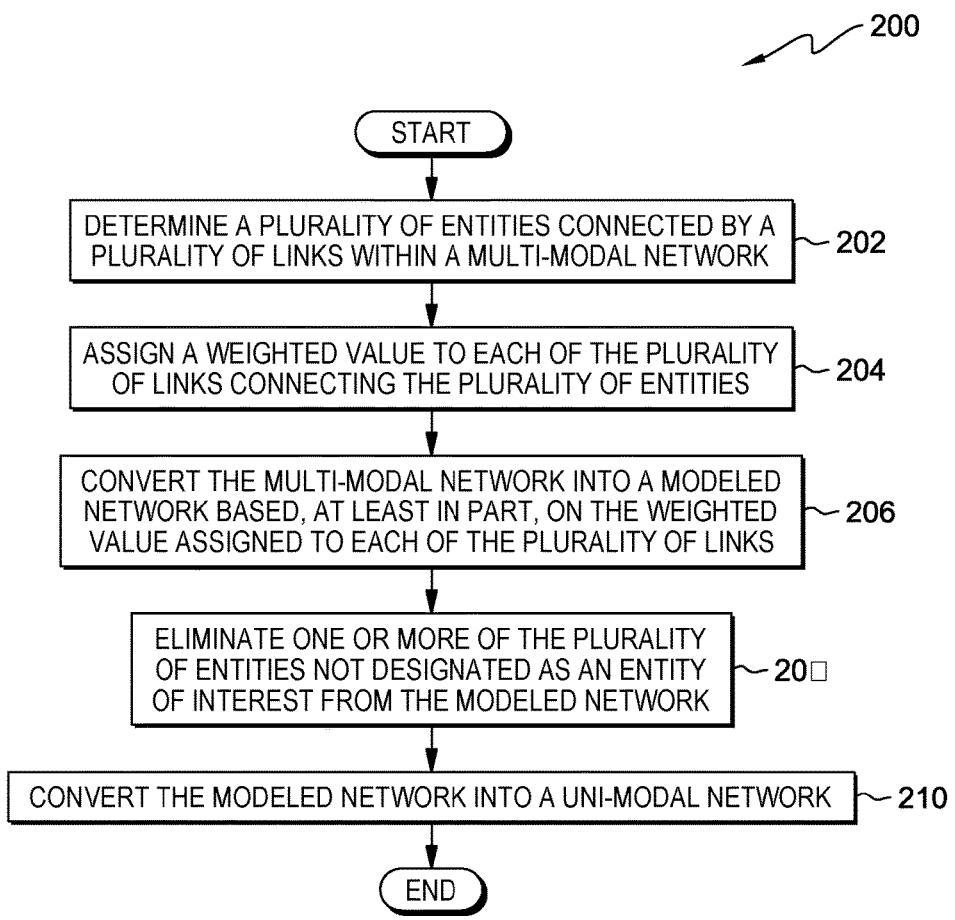
FIG. 2 is a flowchart depicting operational steps of a modality reduction program, in accordance with an embodiment of the present invention.

FIG. 2 depicts a flowchart depicting operational steps of a modality reduction program, such as modality reduction program 108 of FIG. 1, generally designated 200, for processing a multi-modal network to reduce modality, in accordance with an embodiment of the present invention.

Modality reduction program 108 determines a plurality of entities connected by a plurality of links within a multi-modal network (202). In one embodiment, modality reduction program 108 determines a plurality of entities connected by a plurality of links within a multi-modal network by receiving a multi-modal network, such as multi-modal network 106, for analysis through user input. In one embodiment, modality reduction program 108 may receive a multi-modal network as a collection of user inputs, where the collection of user inputs includes the plurality of entities connected by the plurality of links. In one embodiment, modality reduction program 108 accounts for each of the plurality of connections between each of the plurality of entities within the multi-modal network. In other embodiments, modality reduction program 108 determines a plurality of entities connected by a plurality of links within a multi-modal network by retrieving a multi-modal network, such as multi-modal network 106, from a database (not shown). In other embodiments, modality reduction program 108 determines a plurality of entities connected by a plurality of links within a multi-modal network, such as multi-modal network 106, by monitoring real-time interactions and relationships between a person, a place, a computing device, or an organization, etc. In one embodiment, modality reduction program 108 classifies aspects of a multi-modal network, such as multi-modal network 106, as one or more entities of one or more types connected by one or more links of one or more types, and further designates one or more entities of a particular entity type of interest.

Modality reduction program 108 assigns a weighted value to each of the plurality of links connecting the plurality of entities (204). In one embodiment, modality reduction program 108 assigns a weighted value to each of the plurality of links connecting the plurality of entities based, at least in part, on various semantics associated with a type of connection (i.e., a type of link between entities) and a value of relevance associated with the type of connection for a particular purpose of analysis, as defined by a user or other pre-determined values. For example, where the scope of analysis involves social interaction among people, one or more pre-determined weighted vales may be assigned to various links based, at least in part, on the type of link and relevance of the link, such assigning a greater weighted value, indicating a more significant interaction, to frequent phone calls or in-person meetings, and assigning a lower weighted value, indicating a less significant interaction, for infrequent electronic mail communications. In one embodiment, modality reduction program 108 assigns the weighted value to each of the plurality of links connecting the plurality of entities to tailor the processing of the multi-modal network to the scope of analysis. In one embodiment, modality reduction program 108 may receive the weighted value as a user input or as a default value based, at least in part, on a type of connection and the scope of analysis. In one embodiment, modality reduction program 108 may reference a table containing a plurality of pre-determined weighted values associated with a plurality of links, such as an in person meeting may be associated with a weighted value of twelve, a phone call may be associated with a value of six, and an electronic email with a value of three.

Modality reduction program 108 converts the multi-modal network into a modelled network based, at least in part, on the weighted value assigned to each of the plurality of links (206). In one embodiment, modality reduction program 108 converts the multi-modal network into a modelled network, where the modelled network emulates an equivalent electrical circuit with a plurality of resistors representing each of the plurality of links connecting the plurality of entities. In one embodiment, modality reduction program 108 models each of the plurality of links connecting each of the plurality of entities having a weighted value greater than a pre-determined threshold with a resistor. For example, based on the scope and purpose of analysis, a user may define a policy (i.e., a pre-determined threshold) designating a weighted value greater than zero as significant, such that modality reduction program 108 considers only each of the plurality of links connecting each of the plurality of entities having a weighted value greater than zero. In one embodiment, modality reduction program 108 discards each of the plurality of links having a weighted value less than the pre-determined threshold. For example, based on the scope and purpose of analysis, a user may define a policy (i.e., a pre-determined threshold) designating a weighted value less than or equal to zero insignificant, such that modality reduction program 108 discards each of the plurality of links connecting each of the plurality of entities having a weighted value less than or equal to zero. In one embodiment, modality reduction program 108 determines a resistance for each of the plurality of resistors in the equivalent electrical circuit based at least in part, on the weighted value assigned to each of the plurality of links. In one embodiment, modality reduction program 108 determines the resistance of each of the plurality of resistors replacing each of the plurality of links having a weighted value greater than zero as an inverse of the weights assigned to each of the plurality of links. In one embodiment, modality reduction program 108 reduces any resistors (i.e., links) in parallel between a pair of nodes (i.e., entities) to an equivalent single resistor using a standard parallel resistors formula, such as $(1/R = 1/R_1 + 1/R_2 + \ldots)$, and since the weighted value of each of the plurality of links is inversely related to the resistance of each replacement resistor, reducing to the equivalent single resistor is equivalent to adding the weighted values of each of the plurality of links in parallel.

Modality reduction program 108 eliminates one or more of the plurality of entities not designated as an entity of interest from the modelled network (208). In one embodiment, modality reduction program 108 eliminates one or more of the plurality of entities not designated as an entity of interest from the modelled network by determining each of a plurality of nodes in the modelled network representative of each of the plurality of entities that is not of a type of interest for purposes of the scope of analysis, based, at least in part, on user input. For example, where the scope of analysis is curtailed to one type of connection, such as phone calls between relatives, a phone call and a familial relationship between one or more callers are a type of interest for the scope of analysis, whereas an electronic mail communication between two friends is not a type of interest. In one embodiment, modality reduction program 108 removes each of the plurality of nodes one at a time, replacing the node (A) with one or more resistors between one or more neighboring nodes that the eliminated node shares a connection. In one embodiment, modality reduction program 108 determines the resistance of each of the one or more resistors replacing the eliminated node utilizing a standard node elimination formula, such as $R_{XY} = R_{AX} * R_{AY} * \text{Sum of } (1/R_{Ai})$ for all neighboring nodes (i). For example, where an eliminated node shares a connection between neighboring nodes X and Y, modality reduction program 108 may utilize a the weights of each of the plurality of links in a formula $W_{XY} = 1/W_{AX} * 1/W_{AY} * \text{Sum}(W_{Ai})$ to determine the resistance of the one or more resistors replacing the eliminated node. In one embodiment, where there is a connection between the neighboring nodes, then the one or more resistors replacing the eliminated node are in parallel, and modality reduction program 108 may reduce the parallel connections to a single appropriate resistance using the standard parallel resistance formula.

Modality reduction program 108 converts the modelled network into a uni-modal network (210). In one embodiment, responsive to eliminating the one or more of plurality of entities not designated as an entity of interest from the modelled network, modality reduction program 108 converts the modelled network into a uni-modal network, where the uni-modal network contains entities of interest (i.e., nodes) with simplified weighted links (i.e., resistors) between the entities that are representative of the type and significance of the relationship between various entities of interest. An illustrative example of a uni-modal network is depicted and described in further detail with respect to FIG. 4.

Figure 3:
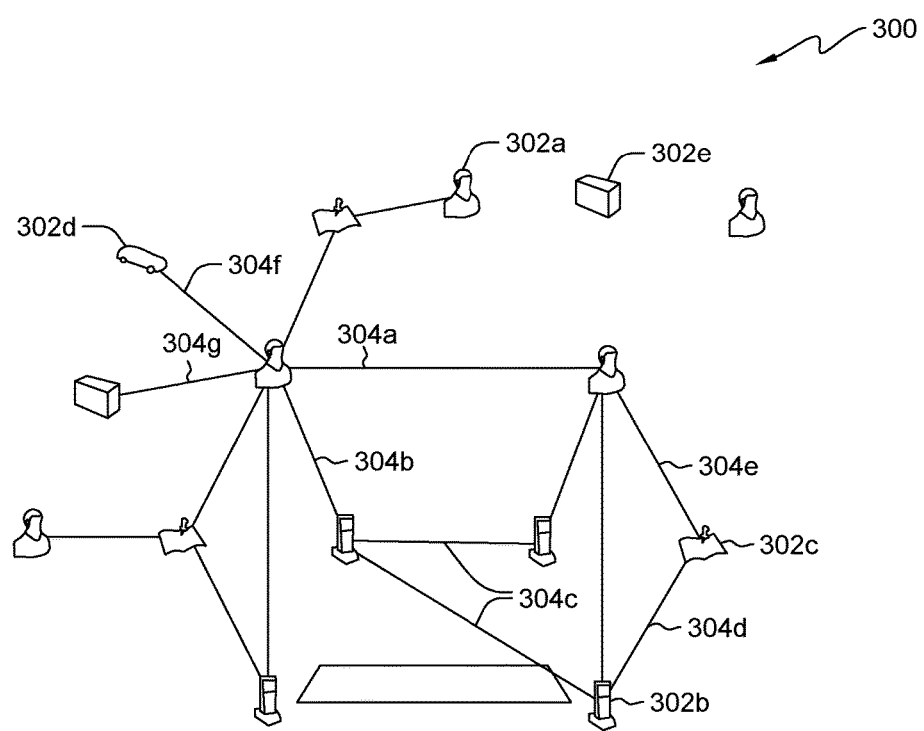
FIG. 3 is a modelling of a multi-modal network (such as the multi-modal network depicted in FIG. 1), in accordance with an embodiment of the present invention.

FIG. 3 depicts a modelling of a multi-modal network, such as multi-modal network 106 of FIG. 1, generally designated 300, in accordance with an embodiment of the present invention.

Multi-modal network 300 depicts a multi-modal network consisting of a plurality of entities of one or more types, such as entity 302(a), 302(b), 302(c), 302(d), and 302(e). In one embodiment, the plurality of entities may include, without limitation, a person, a location, a vehicle, a computing device, and an organization. Each of the plurality of entities are connected by a plurality of links of one or more types, such as link 304(a), 304(b), 304(c), 304(d), 304(e), 304(f), and 304(g). In one embodiment, an associated weighted value (not shown) indicates a significance of distinct connections between each of the plurality of entities. For example, a direct association between two people may be represented with a weighted value twenty times as strong as a single connection (e.g., a phone call) between two phones.

Figure 4:
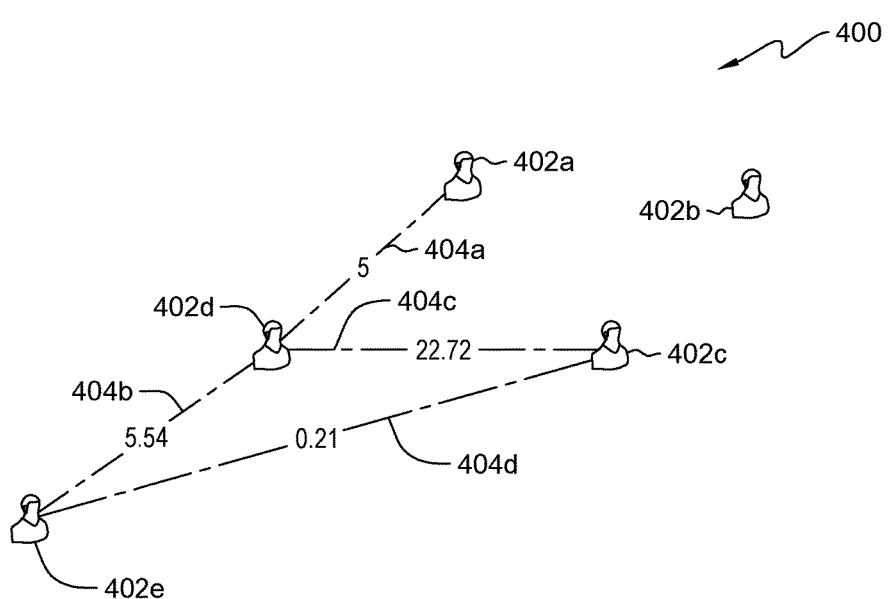
FIG. 4 is a modelling of a multi-modal network (such as the multi-modal network of FIG. 3) converted to a uni-modal network, in accordance with an embodiment of the present invention.

FIG. 4 depicts a modelling of a multi-modal network, such as multi-modal network 300 of FIG. 3, converted to a uni-modal network, generally designated 400, in accordance with an embodiment of the present invention.

Uni-modal network 400 depicts a multi-modal network, such as the multi modal network illustrated in FIG. 3, converted to a uni-modal network consisting of a plurality of nodes of a singular type, such as nodes 402(a), 402(b), 402(c), 402(d), and 402(e). In one embodiment, the plurality of nodes are connected by a plurality of resistors, such as resistor 404(a), 404(b), 404(c), and 404(d), where each of the plurality of resistors has an associated resistance representative of the strength of connection between each of the plurality of nodes, with a greater resistance indicating a weaker connection, since a resistance between each of the plurality of nodes is an inverse of a weighted value assigned to a plurality of entities connected by a plurality of links for which each of the plurality of nodes and associated resistance replace.

Figure 5:
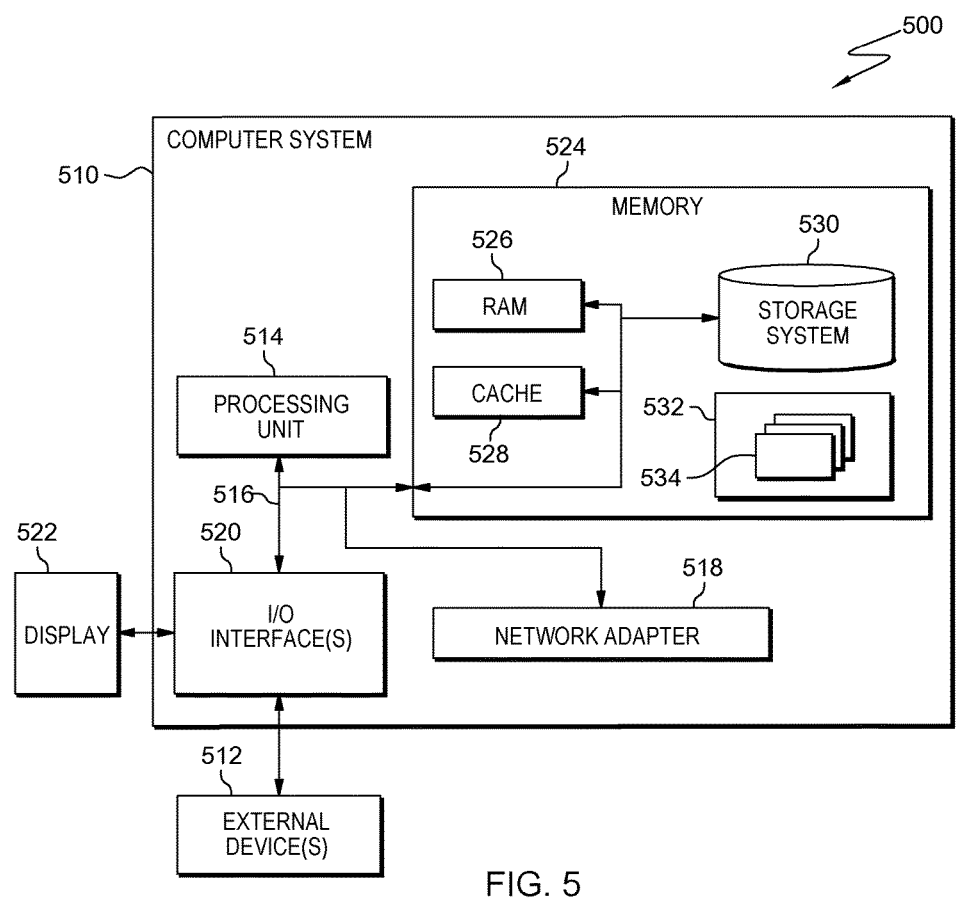
FIG. 5 is a block diagram depicting components of a data processing system (such as the server of FIG. 1), in accordance with an embodiment of the present invention.

FIG. 5 depicts a block diagram of components of data processing system, such as server 104 of FIG. 1, generally designated 500, in accordance with an illustrative embodiment of the present invention. It should be appreciated that FIG. 5 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 510. The components of computer system 510 may include, but are not limited to, one or more processors or processing unit(s) 514, memory 524, and bus 516 that couples various system components including memory 524 to processing unit(s) 514.

Bus 516 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 510 typically includes a variety of computer system readable media. Such media may be any available media that is accessible by computer system 510, and it includes both volatile and non-volatile media, removable and non-removable media.

Memory 524 can include computer system readable media in the form of volatile memory, such as random access memory (RAM) 526 and/or cache memory 528. Computer system 510 may further include other removable/non-removable, volatile/non-volatile computer system storage media. By way of example only, storage system 530 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM, or other optical media can be provided. In such instances, each can be connected to bus 516 by one or more data media interfaces. As will be further depicted and described below, memory 524 may include at least one computer program product having a set (e.g., at least one) of program modules that are configured to carry out the functions of embodiments of the invention.

Program/utility 532, having one or more sets of program modules 534, may be stored in memory 524 by way of example, and not limitation, as well as an operating system, one or more application programs, other program modules, and program data. Each of the operating systems, one or more application programs, other program modules, and program data, or some combination thereof, may include an implementation of a networking environment. Program modules 534 generally carry out the functions and/or methodologies of embodiments of the invention as described herein. Computer system 510 may also communicate with one or more external device(s) 512, such as a keyboard, a pointing device, a display 522, etc., or one or more devices that enable a user to interact with computer system 510 and any devices (e.g., network card, modem, etc.) that enable computer system 510 to communicate with one or more other computing devices. Such communication can occur via Input/Output (I/O) interface(s) 520. Still yet, computer system 510 can communicate with one or more networks, such as a local area network (LAN), a general wide area network (WAN), and/or a public network (e.g., the Internet) via network adapter 518. As depicted, network adapter 518 communicates with the other components of computer system 510 via bus 516. It should be understood that although not shown, other hardware and software components, such as microcode, device drivers, redundant processing units, external disk drive arrays, RAID systems, tape drives, and data archival storage systems may be used in conjunction with computer system 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for processing a multi-modal network to reduce modality, the method comprising:
   determining, by one or more computer processors, a plurality of entities connected by a plurality of links within a multi-modal network;
   assigning, by the one or more processors, a weighted value to each of the plurality of links connecting the plurality of entities;
   converting, by the one or more computer processors, the multi-modal network into a modelled network based, at least in part, on the weighted value assigned to each of the plurality of links;
   eliminating, by the one or more computer processors, one or more of the plurality of entities not designated as an entity of interest from the modelled network; and
   converting, by the one or more computer processors, the modelled network into a uni-modal network, where the uni-modal network contains a plurality of nodes designated as entities of interest connected by a plurality of resistors designated as simplified weighted links between the entities of interest, where each of the plurality of resistors has an associated resistance representative of a strength of connection between each of the plurality of nodes, with a greater resistance indicating a weaker connection as a resistance between each of the plurality of nodes is an inverse of the weighted value assigned to each of the plurality of entities connected by each of the plurality of links replaced by the plurality of nodes and associated resistance.

2. The method of claim 1, wherein determining the plurality of entities connected by the plurality of links within the multi-modal network, further comprises one or more of:
   receiving, by the one or more computer processors, the multi-modal network as a collection of user inputs, where the collection of user inputs includes the plurality of entities connected by the plurality of links;
   retrieving, by the one or more computer processors, the multi-modal network from a database; and
   monitoring, by the one or more computer processors, one or more real-time interactions and one or more relationships between the plurality of entities, wherein monitoring includes accounting for each of the plurality of connections between each of the plurality of entities within the multi-modal network.

3. The method of claim 1, wherein assigning the weighted value to each of the plurality of links connecting the plurality of entities, further comprises:
assigning, by the one or more computer processors, the weighted value to each of the plurality of links connecting the plurality of entities based, at least in part, on a plurality of semantics associated with a type of connection and a value of relevance associated with the type of connection.

4. The method of claim 1, wherein the modelled network replaces each of the plurality of links connecting the plurality of entities with a plurality of resistors to represent an equivalent electrical circuit.

5. The method of claim 1, wherein converting the multi-modal network into the modelled network, further comprises:
modelling, by the one or more computer processors, each of the plurality of links connecting each of the plurality of entities having a weighted value greater than zero with a resistor;
discarding, by the one or more computer processors, each of the plurality of links having a weighted value of zero; and
determining, by the one or more computer processors, a resistance for each of a plurality of resistors in an equivalent electrical circuit based at least in part, on the weighted value assigned to each of the plurality of links.

6. The method of claim 5, wherein determining the resistance for each of the plurality of resistors, further comprises:
determining, by the one or more compute processors, the resistance of each of the plurality of resistors replacing each of the plurality of links having a weighted value greater than zero as an inverse of the weights assigned to each of the plurality of links; and
reducing, by the one or more computer processors, each of the plurality of resistors in parallel between a pair of nodes to an equivalent single resistor using a standard parallel resistors formula, wherein reducing to the equivalent single resistor is equivalent to adding each of the weighted values of each of the plurality of links in parallel.

7. The method of claim 1, wherein eliminating one or more of the plurality of entities not designated as an entity of interest from the modelled network, further comprises:
determining, by the one or more computer processors, each of a plurality of nodes in the modelled network representative of the plurality of entities that is not of a type of interest for a particular purpose based, at least in part, on user input;
removing, by the one or more computer processors, each of the plurality of nodes one at a time, replacing each of the plurality of nodes with one or more resistors between one or more neighboring nodes that each of the plurality of nodes shares a connection; and
determining, by the one or more computer processors, a resistance for each of the one or more resistors replacing each of the plurality of nodes utilizing a standard node elimination formula for the one or more neighboring nodes.

8. A computer program product for processing a multi-modal network to reduce modality, the computer program product comprising:
one or more computer readable storage media and program instructions stored on the one or more computer readable storage media, the program instructions comprising:
program instructions to determine a plurality of entities connected by a plurality of links within a multi-modal network;
program instructions to assign a weighted value to each of the plurality of links connecting the plurality of entities;
program instructions to convert the multi-modal network into a modelled network based, at least in part, on the weighted value assigned to each of the plurality of links;
program instructions to eliminate one or more of the plurality of entities not designated as an entity of interest from the modelled network; and
program instructions to convert the modelled network into a uni-modal network, where the uni-modal network contains a plurality of nodes designated as entities of interest connected by a plurality of resistors designated as simplified weighted links between the entities of interest, where each of the plurality of resistors has an associated resistance representative of a strength of connection between each of the plurality of nodes, with a greater resistance indicating a weaker connection as a resistance between each of the plurality of nodes is an inverse of the weighted value assigned to each of the plurality of entities connected by each of the plurality of links replaced by the plurality of nodes and associated resistance.

9. The computer program product of claim 8, wherein program instructions to determine the plurality of entities connected by the plurality of links within the multi-modal network, further comprise one or more of:
program instructions to receive the multi-modal network as a collection of user inputs, where the collection of user inputs includes the plurality of entities connected by the plurality of links;
program instructions to retrieve the multi-modal network from a database; and
program instructions to monitor one or more real-time interactions and one or more relationships between the plurality of entities, wherein monitoring includes accounting for each of the plurality of connections between each of the plurality of entities within the multi-modal network.

10. The computer program product of claim 8, wherein program instructions to assign the weighted value to each of the plurality of links connecting the plurality of entities, further comprise:
program instructions to assign the weighted value to each of the plurality of links connecting the plurality of entities based, at least in part, on a plurality of semantics associated with a type of connection and a value of relevance associated with the type of connection.

11. The computer program product of claim 8, wherein the modelled network replaces each of the plurality of links connecting the plurality of entities with a plurality of resistors to represent an equivalent electrical circuit.

12. The computer program product of claim 8, wherein program instructions to convert the multi-modal network into the modelled network, further comprise:
program instructions to model each of the plurality of links connecting each of the plurality of entities having a weighted value greater than zero with a resistor;
program instructions to discard each of the plurality of links having a weighted value of zero; and program instructions to determine a resistance for each of a plurality of resistors in an equivalent electrical circuit based at least in part, on the weighted value assigned to each of the plurality of links.

13. The computer program product of claim 12, wherein program instructions to determine the resistance for each of the plurality of resistors, further comprise:
   program instructions to determine the resistance of each of the plurality of resistors replacing each of the plurality of links having a weighted value greater than zero as an inverse of the weights assigned to each of the plurality of links; and
   program instructions to reduce each of the plurality of resistors in parallel between a pair of nodes to an equivalent single resistor using a standard parallel resistors formula, wherein reducing to the equivalent single resistor is equivalent to adding each of the weighted values of each of the plurality of links in parallel.

14. The computer program product of claim 8, wherein program instructions to eliminate one or more of the plurality of entities not designated as an entity of interest from the modelled network, further comprises:
   program instructions to determine each of a plurality of nodes in the modelled network representative of the plurality of entities that is not of a type of interest for a particular purpose based, at least in part, on user input;
   program instructions to remove each of the plurality of nodes one at a time, replacing each of the plurality of nodes with one or more resistors between one or more neighboring nodes that each of the plurality of nodes shares a connection; and
   program instructions to determine a resistance for each of the one or more resistors replacing each of the plurality of nodes utilizing a standard node elimination formula for the one or more neighboring nodes.

15. A computer system for processing a multi-modal network to reduce modality, the computer system comprising:
   one or more computer processors;
   one or more computer readable storage media; and
   program instructions stored on at least one of the one or more computer readable storage media for execution by at least one of the one or more computer processors, the program instructions comprising:
   program instructions to program instructions to determine a plurality of entities connected by a plurality of links within a multi-modal network;
   program instructions to assign a weighted value to each of the plurality of links connecting the plurality of entities;
   program instructions to convert the multi-modal network into a modelled network based, at least in part, on the weighted value assigned to each of the plurality of links;
   program instructions to eliminate one or more of the plurality of entities not designated as an entity of interest from the modelled network; and
   program instructions to convert the modelled network into a uni-modal network, where the uni-modal network contains a plurality of nodes designated as entities of interest connected by a plurality of resistors designated as simplified weighted links between the entities of interest, where each of the plurality of resistors has an associated resistance representative of a strength of connection between each of the plurality of nodes, with a greater resistance indicating a weaker connection as a resistance between each of the plurality of nodes is an inverse of the weighted value assigned to each of the plurality of entities connected by each of the plurality of links replaced by the plurality of nodes and associated resistance.

16. The computer system of claim 15, wherein program instructions to determine the plurality of entities connected by the plurality of links within the multi-modal network, further comprise one or more of:
   program instructions to receive the multi-modal network as a collection of user inputs, where the collection of user inputs includes the plurality of entities connected by the plurality of links;
   program instructions to retrieve the multi-modal network from a database; and
   program instructions to monitor one or more real-time interactions and one or more relationships between the plurality of entities, wherein monitoring includes accounting for each of the plurality of connections between each of the plurality of entities within the multi-modal network.

17. The computer system of claim 15, wherein the modelled network replaces each of the plurality of links connecting the plurality of entities with a plurality of resistors to represent an equivalent electrical circuit.

18. The computer system of claim 15, wherein program instructions to convert the multi-modal network into the modelled network, further comprise:
   program instructions to model each of the plurality of links connecting each of the plurality of entities having a weighted value greater than zero with a resistor;
   program instructions to discard each of the plurality of links having a weighted value of zero; and
   program instructions to determine a resistance for each of a plurality of resistors in an equivalent electrical circuit based at least in part, on the weighted value assigned to each of the plurality of links.

19. The computer system of claim 18, wherein program instructions to determine the resistance for each of the plurality of resistors, further comprise:
   program instructions to determine the resistance of each of the plurality of resistors replacing each of the plurality of links having a weighted value greater than zero as an inverse of the weights assigned to each of the plurality of links; and
   program instructions to reduce each of the plurality of resistors in parallel between a pair of nodes to an equivalent single resistor using a standard parallel resistors formula, wherein reducing to the equivalent single resistor is equivalent to adding each of the weighted values of each of the plurality of links in parallel.

20. The computer system of claim 15, wherein program instructions to eliminate one or more of the plurality of entities not designated as an entity of interest from the modelled network, further comprises:
   program instructions to determine each of a plurality of nodes in the modelled network representative of the plurality of entities that is not of a type of interest for a particular purpose based, at least in part, on user input;
   program instructions to remove each of the plurality of nodes one at a time, replacing each of the plurality of nodes with one or more resistors between one or more neighboring nodes that each of the plurality of nodes shares a connection; and program instructions to determine a resistance for each of the one or more resistors replacing each of the plurality of nodes utilizing a standard node elimination formula for the one or more neighboring nodes.

\* \* \* \* \*